(12) United States Patent
Morgan et al.

(10) Patent No.: US 7,377,463 B2
(45) Date of Patent: May 27, 2008

(54) NOISE REDUCING SEAT BELT RETRACTOR

(75) Inventors: Christopher D. Morgan, Sterling Heights, MI (US); Bayard C. Temple, Washington, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 451 days.

(21) Appl. No.: 11/125,277

(22) Filed: May 9, 2005

(65) Prior Publication Data

US 2006/0249618 A1    Nov. 9, 2006

(51) Int. Cl.
 *B60R 22/40* (2006.01)
(52) U.S. Cl. ............... 242/382; 242/382.2; 242/382.4; 242/384; 242/385; 280/805; 280/806
(58) Field of Classification Search ............. 242/382.2, 242/384, 379.1, 382.4, 385.1–385.3; 464/72, 464/97–99, 180; 280/805, 806; 297/475, 297/480
See application file for complete search history.

(56) References Cited

U.S. PATENT DOCUMENTS

| 4,066,223 | A | * | 1/1978 | Takada | 242/384.2 |
| 4,645,138 | A | * | 2/1987 | Kapanka | 242/383.4 |
| 5,797,474 | A | * | 8/1998 | Nakane et al. | 192/207 |
| 5,934,596 | A | * | 8/1999 | Gorman et al. | 242/379.1 |
| 6,109,556 | A |   | 8/2000 | Kopetzky et al. | |
| 2003/0015616 | A1 | * | 1/2003 | Palliser | 242/382.2 |
| 2003/0132334 | A1 | * | 7/2003 | Koning et al. | 242/382 |
| 2003/0205638 | A1 | * | 11/2003 | Wier | 242/383.4 |

* cited by examiner

*Primary Examiner*—Peter M. Cuomo
*Assistant Examiner*—Stefan Kruer
(74) *Attorney, Agent, or Firm*—Lonnie Drayer (57) ABSTRACT

A seat belt retractor has a spool for carrying seat belt webbing rotatably mounted about a longitudinal axle and biased in a seat belt webbing rewinding direction. A toothed ratchet wheel is mounted to rotate with the spool. A sensor is provided for detecting an emergency condition, and a vehicle acceleration sensor lever is responsive to the sensor to engage the ratchet wheel in an emergency. The retractor can operate in a first, emergency locking mode in which the spool is not locked and can rotate to pay-out and to rewind seat belt webbing. In a second, automatic locking mode the spool is locked against pay-out of the seat belt webbing. A switching means has a subassembly attached to an end of the seat belt retractors. The subassembly has an axially directed spring to reduce axial spacing between the housing, an eccentric cam and axially adjacent disks.

15 Claims, 9 Drawing Sheets

NOISE REDUCING SEAT BELT RETRACTOR

FIELD OF THE INVENTION

The current invention relates to seat belt retractors.

BACKGROUND OF THE INVENTION

A conventional seat belt retractor allows a vehicle occupant some freedom of movement, but has a sensor to detect acceleration above a predetermined magnitude indicative of an emergency situation. The seat belt retractor then locks, arresting the vehicle occupant's movement. This can also occur when the vehicle occupant leans forward too quickly to reach a control on the instrument panel. Seat belts which allow movement are desirable for adult vehicle occupants as they restrain passengers in emergency situations but are comfortable because they allow a reasonable degree of freedom for movement during normal driving conditions. When transporting a young child with a child seat the child seat must be fixed in place, but it is desirable for the same seat belt retractor to also operate as a normal inertial retractor to provide the expected comfort for an adult.

This problem is a well known and several solutions have been proposed. U.S. Pat. No. 6,109,556 teaches a seat belt arrangement for motor vehicles, specially adapted for use with a child seat to switch between a fixed mode for the child seat and an automatic mode for adults. Such a seat belt retractor is known as a Child Hold Out Mechanism, sometimes referred to as a "CHOM".

U.S. Pat. No. 6,109,556 teaches a retractor switching means comprising a cam connected to a spool via a step down gearing arrangement and a cam follower. The step down gearing arrangement comprises an inner gear ring and a gear arrangement with a drive peg located at a predetermined radius. The drive peg is arranged to move cycloidally and rotate the cam when the gear rotates. This cycloidal motion often results in the gear arrangement being known as a "wobble" gear. The cam follower is pivotally mounted and arranged to be in continuous contact with the cam surface. At a predetermined rotational orientation of the cam, the cam follower urges the sensor lever into engagement with a toothed ratchet wheel fixed to the spool to lock the spool and seat belt webbing protraction.

A particular problem with Child Hold Out Mechanism retractors is that a large number of components are needed and this increases the size of the retractor as well as introducing numerous components that generate noise commonly referred to as "rattle noise".

It is therefore an object of the present invention to provide a noise reducing feature to such seat belt retractors.

SUMMARY OF THE INVENTION

There is provided in accordance with the present invention a seat belt retractor comprising a spool for carrying seat belt webbing rotatably mounted about a longitudinal axle and biased in a seat belt webbing rewinding direction, a toothed ratchet wheel mounted to rotate with the spool, a sensor for detecting an emergency condition, a vehicle acceleration sensor lever responsive to the sensor to engage the ratchet wheel in the event of an emergency condition, means for locking the spool against pay-out of seat belt webbing in response to the vehicle acceleration sensor lever engaging the ratchet wheel, the retractor being adapted to operate in a first, emergency locking mode in which the spool is not locked and can rotate to pay-out and to rewind seat belt webbing. In a second, automatic locking mode in which the spool is locked against pay-out of the seat belt webbing and means for switching between the first mode and the second mode, wherein, the switching means comprises a subassembly attached to a first end of said seat belt retractor, the subassembly having a housing, a plurality of annular axially adjacent disks mounted on a rotatable eccentric cam connected to said housing characterized by an axially directed spring biasing member to reduce axial spacing between said housing, eccentric cam and said plurality of annularly adjacent disks.

The subassembly may further include a drive pin mounted at a first end of said axle of said seat belt retractor and fixedly attached to said eccentric cam to provide rotational movement of said cam as said seat belt webbing is protracted.

The plurality of axially adjacent disks include a gear having an axially projecting pin; a child hold out mechanism disk having a slot for accepting said projecting pin; and a blockout disk having an opening for accepting said pin.

In a preferred embodiment the axially directed spring biasing member is an integral portion of one of said disk, more preferably in the child hold out mechanism disk includes the integral axially directed spring biasing member formed as an inner ring or projecting appendage portion mounted on said eccentric cam as a split ring. The split ring forms a spiraled ring having an axially projecting end when formed as a ring the ring is cut having a projecting end which provides a spring biasing force. The axially directed spring biasing member extends axially from the disk generally planar surface a distance (y) and wherein a gap (g) between a flange on said eccentric cam and the plurality of disks and as measured as the distance X between an inside surface of the housing and an inside surface of the cam flange minus the combined axial thickness of the disks is (g), wherein (g) is less than (y). Similarly when formed as a projecting appendage that portion acts as a leaf spring also projecting a distance (y) The spring biasing member applies a force to insure at least partial contact between each axially adjacent component sufficing to reduce rattle noise. The spring biasing member can be radially adjacent the eccentric cam. When the axially directed spring biasing member is interposed between two adjacent disks the disks are held apart by a distance approximating or substantially equal to said gap (g). This insures the opposing surfaces of said disks are spaced, whereby, in order for the disks to come into contact they must overcome the spring force. This provides an overall noise reduction of the seat belt retractor subassembly.

Definitions

"Axial" means in a direction parallel to an axle of the seat belt retractor.

"ALR" means Automatic Locking Retractor.

"CHOM" means Child Holdout Mechanism.

"ELR" means Emergency Locking Retractor.

"Radial" means in a direction extending from the axis of rotation of the axle of the seat belt retractor.

"Wobble Gear" means a cycloidal gear.

DETAILED DESCRIPTION OF THE INVENTION

Figure 1:
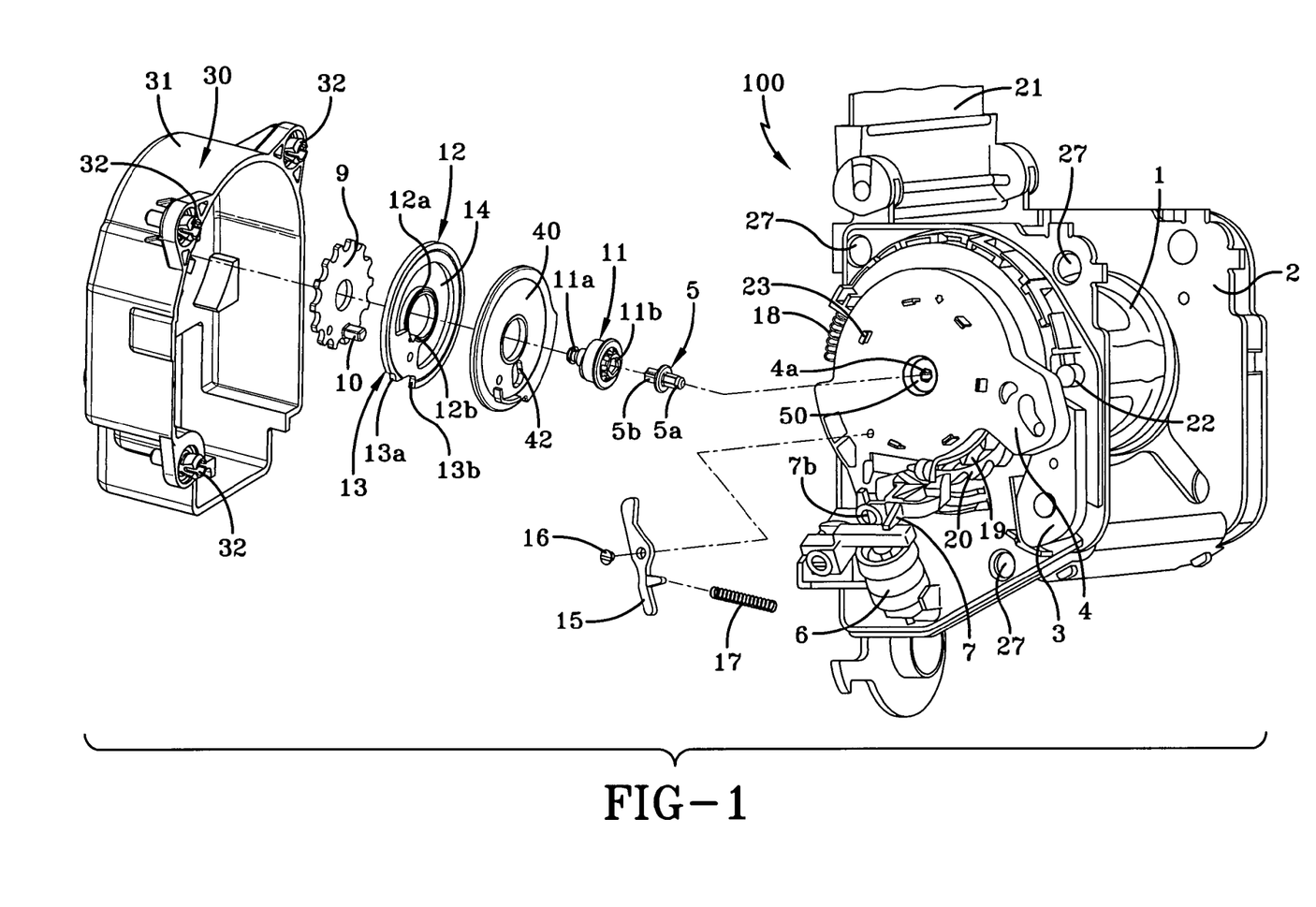
FIG. 1 is a partially exploded perspective view of an exemplary seat belt retractor according to the present invention.

In FIG. 1, an exemplary vehicle seat belt retractor 100 is shown with the seat belt webbing 21 substantially fully protracted from a spool 1 mounted in a frame 2 with a subassembly shown in an exploded view detached from the end of the retractor. Thus the individual parts of the mechanism can be more clearly seen. Like reference signs are used throughout the figures. The seat belt retractor 100 comprises a lock bar 3, a pivotable mounting member 4, drive pin 5, a drive axle 50, a vehicle acceleration sensor 6, a vehicle acceleration sensor lever 7 pivotable about a pivot point 7b, an inner gear ring 8, a wobble gear arrangement 9, a pin 10, an eccentric cam 11, a CHOM disk 12 with a cam surface having an indentation 13 therein comprising a ramp 13a and a step 13b that is substantially radial to the cam surface for engaging an actuation lever 15, a window or slot 14, an actuation lever pivot fastener 16, an actuation lever spring 17, a mounting member spring 18, a ratchet wheel 19, a lock gear 20, a fixed mounting member 22 and mounting lugs 23. The actuation lever 15 has a relatively smaller contact area with the cam surface of the CHOM disk 12 when not in engagement with the indentation 13 in the cam surface than when in engagement with the indentation in the cam surface. The exemplary seat belt retractor 100 of the figures operates in two distinct modes: a first, Emergency Locking Retractor (ELR) mode; and a second, Automatic Locking Retractor (ALR) mode. In ELR mode, seat belt webbing 21 can be wound onto the spool 1 and pulled from the spool 1. This allows the vehicle occupant to move freely to, for example, adjust a radio or a control on a vehicle instrument panel. Sudden movements, however, which have an acceleration greater than a predetermined magnitude, for example caused by a sharp vehicle deceleration, cause the seat belt retractor to lock. This prevents further payout of the seat belt webbing 21 and restrains the vehicle occupant. Most vehicle occupants use the seat belt retractor in ELR mode.

In ALR mode, seat belt webbing 21 can be retracted on to the spool 1 but not pulled from the spool 1. This mode is used when restraining a child seat in a vehicle.

To switch to ALR mode, a predetermined amount of seat belt webbing 21 is pulled from the spool 1. This activates a mechanism that locks the spool 1 against further payout of seat belt webbing 21.

Usually this switching occurs when substantially the whole of the seat belt webbing 21 is retracted, for example, is wound on the spool 1. The spool 1 is biased in the retraction direction of the seat belt webbing 21.

FIG. 1 is a partially exploded view of the subassembly of the seat belt retractor 100 shown. This clearly shows the housing 31, the drive pin 5, the wobble gear 9, the pin 10, located on the wobble gear 9, the eccentric cam 11, the CHOM disk 12 with the window 14 cut through the CHOM disk 12, the blockout disk 40 and the actuation lever 15.

The window or slot 14 comprises a concentric arcuate slot cut through the face of the CHOM disk 12 and having an inner wall and an outer wall at respective predetermined radii from the center of the cam and each having a predetermined arcuate length. In the particular embodiment shown, the arcuate slot 14 extends through an angle of just less than 180 degrees.

The pin 10 is located at a predetermined radius on the wobble gear 9. The position of the pin 10 within the slot 14 is determined by the amount of seat belt webbing 21 that has been pulled from the spool 1.

The actuation lever 15 is pivotally attached to the pivotable mounting member 4 at the pivot point fastener 16. One portion of the actuation lever 15 is biased towards the cam surface of CHOM disk 12 by the actuation lever spring 17. In the embodiment shown, a helical spring in compression is in the actuation lever spring 17 that causes the actuation lever 15 to remain in contact with the cam surface of the CHOM disk 12 irrespective of the rotational orientation of the CHOM disk 12.

A mounting member 22 is fixedly attached to a frame 2. The fixed mounting member 22 can be made of a plastic material and the frame 2 can be made of metal.

Figure 15:
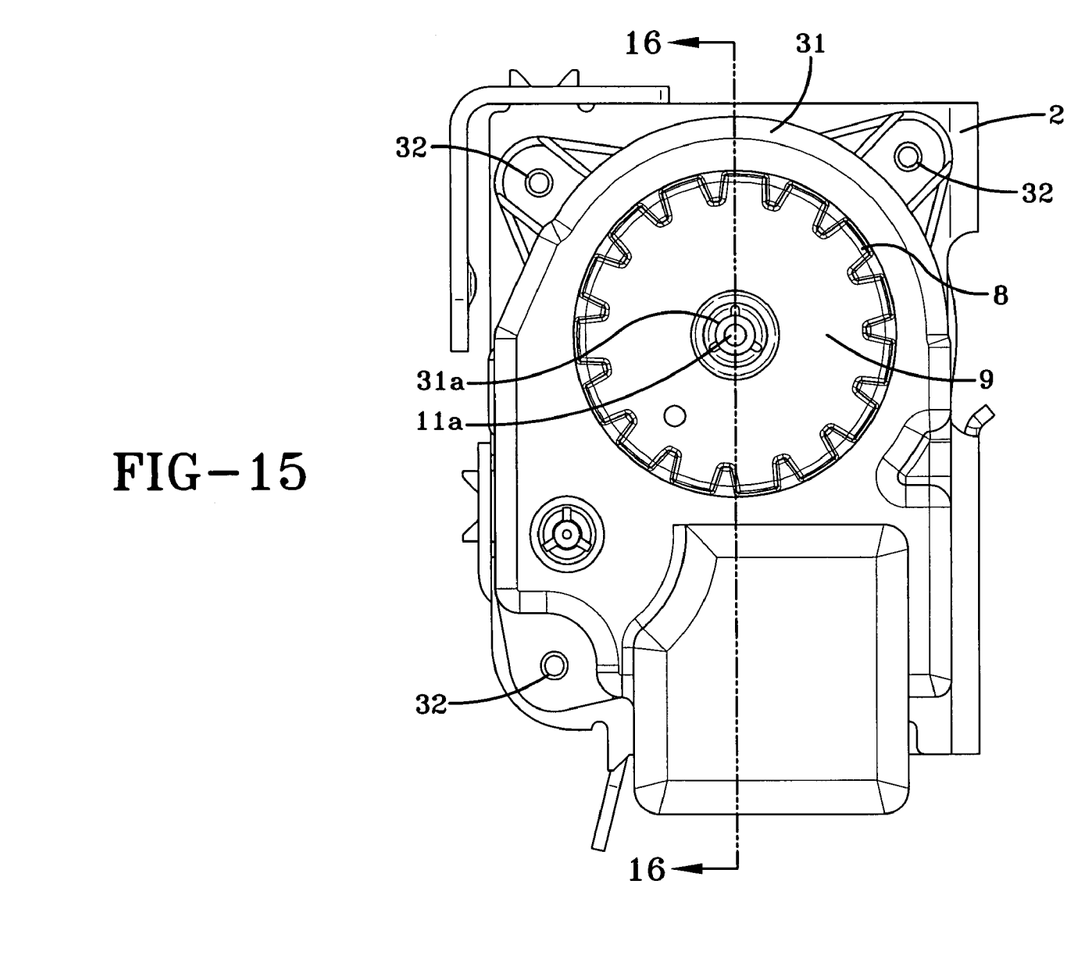
FIG. 15 is an end view of the seat belt retractor with the subassembly shown mounted to the retractor according to the present invention.

The vehicle acceleration sensor lever 7 is pivotally mounted to the pivotable mounting member 4 at a pivot point 7b. The vehicle acceleration sensor 6 is a standing man sensor, well known in the art, that is mounted on the pivotable mounting member 4 to detect vehicle accelerations and decelerations above a predetermined magnitude and upon detection of said accelerations/decelerations to bias the vehicle acceleration sensor lever against at least one tooth on the ratchet wheel. The vehicle acceleration sensor 6 may take other forms. The internal gear ring 8 is fixed to the housing 31 as best seen in FIG. 15. In one embodiment, the step-down gearing is a cycloidal gear system commonly known as a wobble gear 9. However, other step-down gearing can be used. Preferably, the step-down gearing is a cycloidal system comprising an eccentric cam. The drive pin 5, the eccentric cam 11, the wobble gear 9 and the CHOM disk 12 can all move relative to the pivotable mounting member 4.

Fixedly mounted to the drive axle 50 are a ratchet wheel 19 and a lock gear 20, as shown in FIG. 1. The vehicle acceleration sensor 6 detects accelerations/decelerations above a predetermined magnitude. When accelerations/decelerations are below the predetermined magnitude, the vehicle acceleration sensor lever 7, pivotable about a pivot point 7b is not engaged with the ratchet wheel 19. This allows rotation of the spool 1 and hence the eccentric cam 5, ratchet wheel 19 and lock gear 20, in both seat belt webbing 21 extraction and retraction directions. When the vehicle acceleration sensor 6 detects accelerations/decelerations above a predetermined magnitude, the vehicle acceleration sensor lever 7 pivots about the pivot point 7b and engages with at least one tooth on the ratchet wheel 19. Preferably, the vehicle acceleration sensor lever 7 is the only lever arranged to engage the ratchet wheel 19. This allows a relatively substantial reduction in size over known seat belt retractors of this type that use additional levers to engage the ratchet. One portion of the vehicle acceleration sensor lever 7 is arranged to co-operate with the sensor 6 and another portion is arranged for engagement with the ratchet wheel 19 and wherein the pivot point 7b of the vehicle acceleration sensor lever 7 is located between each of said portions. Any further rotation of the spool 1, and hence the drive axle 50, the ratchet wheel 19 and the lock gear 20, in the direction of seat belt webbing 21 pay-out, is communicated by the vehicle acceleration sensor lever 7 to the pivotable mounting member 4 causing it to rotate in the same direction as the spool 1, compressing the mounting member spring 18 and causing the lock bar 3, which is pivotally mounted on the frame 2 to engage with the lock gear 20 fully arresting the rotation of the spool 1. This happens during vehicle crashes and when a vehicle occupant pulls too sharply on the seat belt webbing 21.

The operation of the seat belt retractor as it switches from ELR mode, as shown, into ALR mode, is more fully described in U.S. Pat. No. 6,631,865 which is incorporated herein by reference in its entirety. For purposes of this invention the actual performance of the mechanism is somewhat irrelevant except for the fact that the functioning of the seat belt retractor and more specifically the child holdout mechanism subassembly must not be impeded by the addition of the noise dampening features described below.

Figure 2:
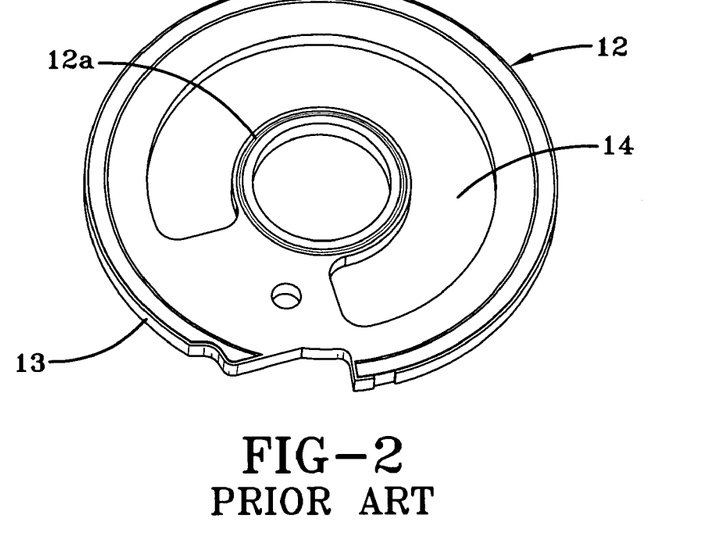
FIG. 2 is a perspective view of a CHOM disk according to the prior art.
Figure 3:
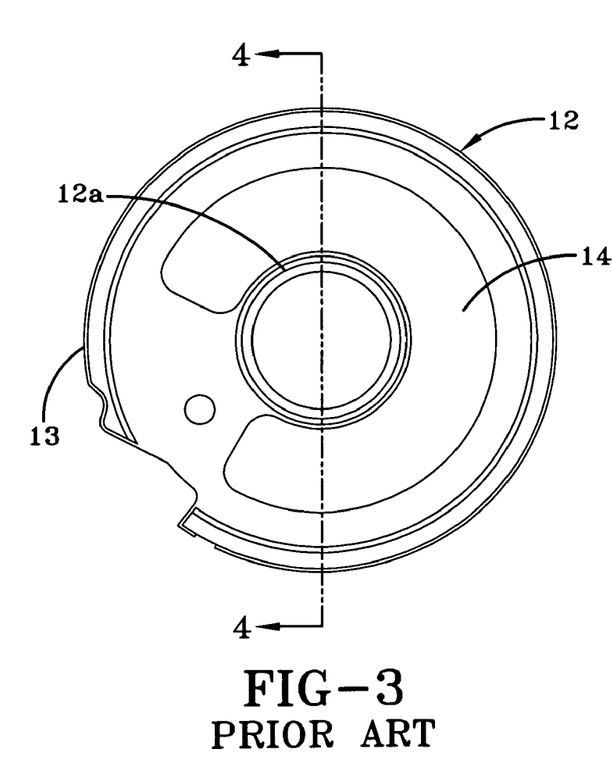
FIG. 3 is a plan view of the prior art CHOM disk of FIG. 2.
Figure 4:
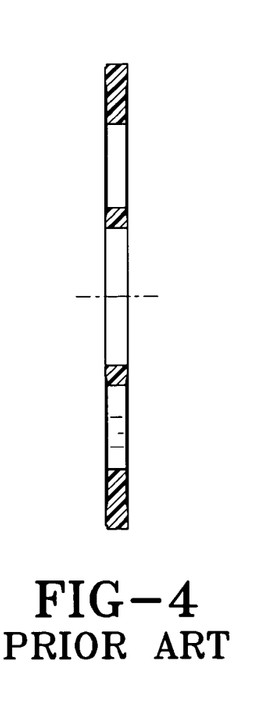
FIG. 4 is a cross sectional view of the prior art CHOM disk.

With reference to FIGS. 2-4 a prior art CHOM disk 12 is shown the CHOM disk 12 has the window or arcuate slot 14 and cam surface 13 as illustrated. At the inner diameter of the CHOM disk 12 is shown an annular ring 12a, this annular ring 12a is adapted to be mounted on the eccentric cam 11. As shown in the cross sectional view the CHOM disk 12 has a substantially parallel and planar surface having a thickness (t).

Figure 5:
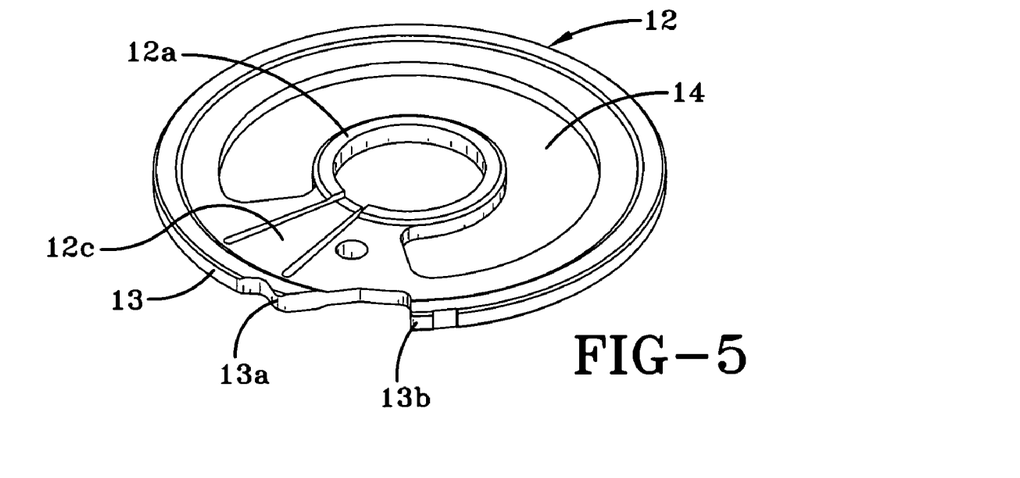
FIG. 5 is a perspective view of a CHOM disk according to a first embodiment of the invention.
Figure 6:
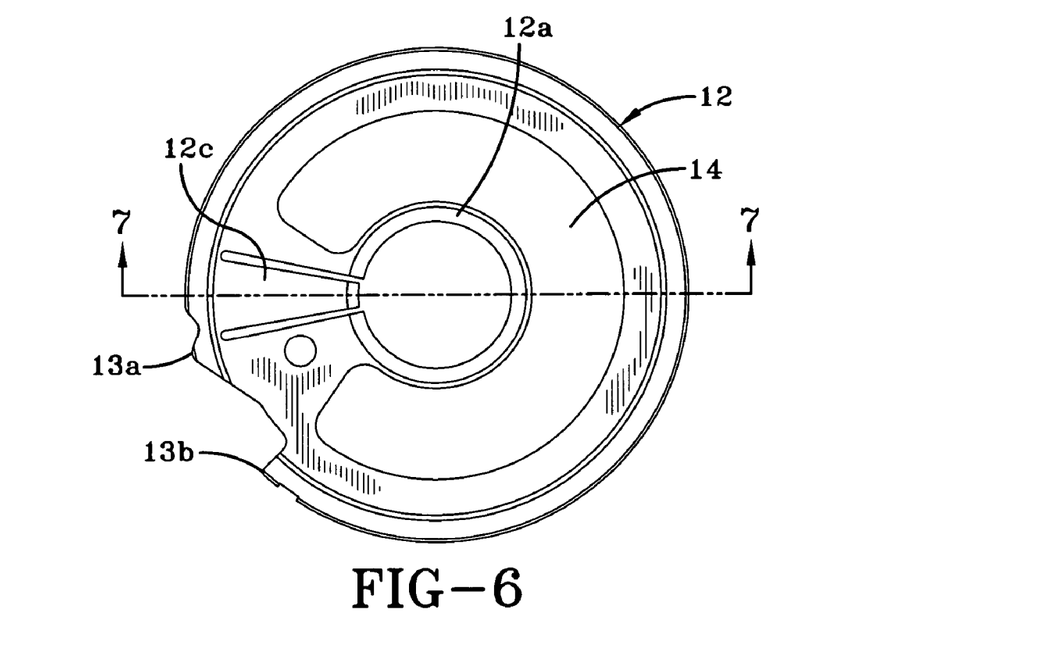
FIG. 6 is a plan view of the CHOM disk of FIG. 5.
Figure 7:
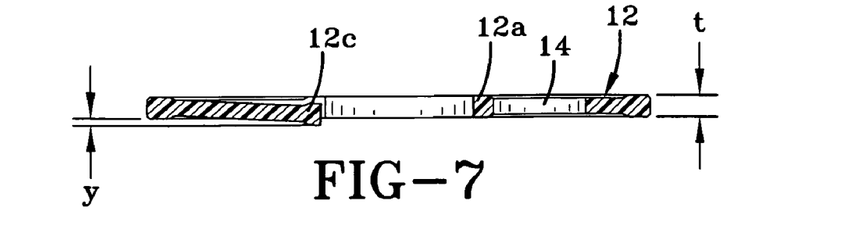
FIG. 7 is a cross sectional view taken along lines 7-7 of the CHOM disk of FIG. 6.
Figure 8:
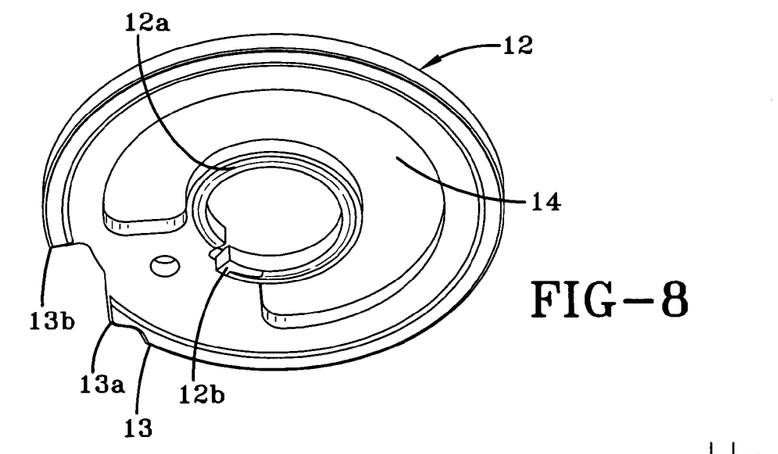
FIG. 8 is a perspective view of a second and preferred embodiment CHOM disk according to the present invention.
Figure 9:
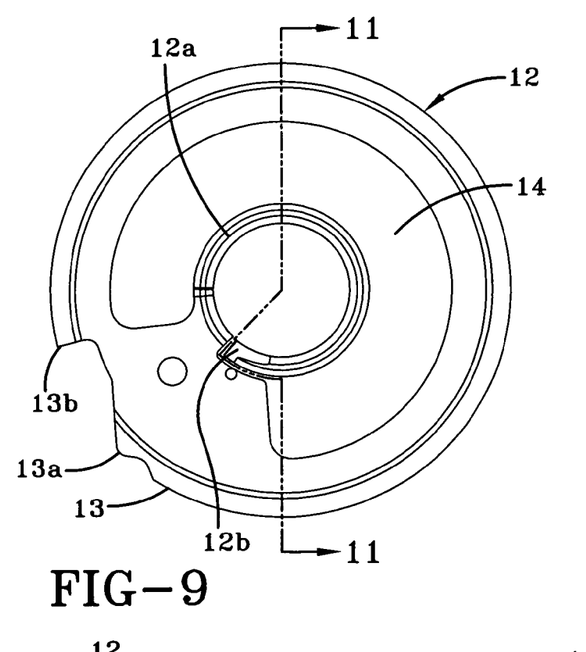
FIG. 9 is a plan view of the CHOM disk of FIG. 8.
Figure 10:
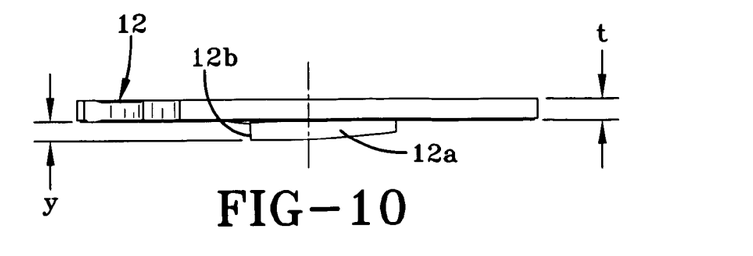
FIG. 10 is a side view of the CHOM disk of FIG. 8.
Figure 11:
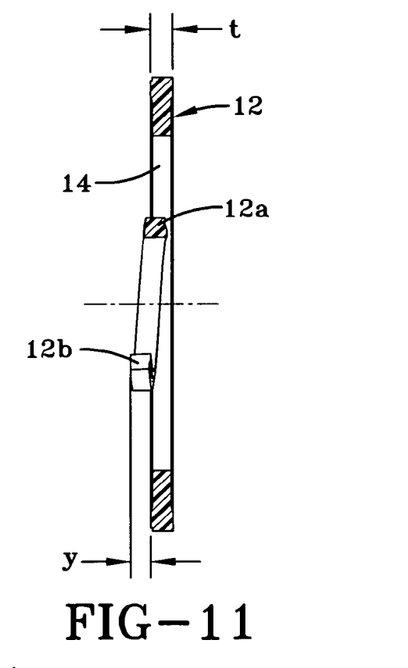
FIG. 11 is a cross sectional view of the CHOM disk of FIG. 9 taken along lines 11-11.

With reference to FIGS. 5, 6 and 7 a CHOM disk 12 according to a first embodiment of the present invention is shown. The CHOM disk 12 is modified such that an appendage 12c is illustrated wherein the appendage 12c acts as a leaf spring or axially directed spring biasing member projecting outward from the surface as shown in FIG. 7. This slight projection outward from the surface creates an axially directed spring force to be generated when the assembly is made such that the CHOM disk 12 exerts an axial force against the other components thereby taking the slack out and any gap (g) that might be created during the assembly. This is particularly important in mass production wherein tolerance stack ups are such that one must provide a sufficient amount of gap (g) so that all the components can be adequately assembled otherwise the components will simply not fit when assembled.

With reference to FIGS. 8, 9, 10 and 11 a preferred and second embodiment of the present invention is shown wherein the CHOM disk 12 has the inner ring portion 12a split in such a fashion that an end 12b is projecting outward from the surface, this end 12b projects out a distance (y) from the planar surface, this distance (y) is sufficiently wider than any tolerance gap (g) created by the assembly of components as the components are mounted the end 12b deflects by an amount of (g) such that the gap (g) is eliminated completely this insures that all the components are assembled and in contact such that no rattle or vibration noises can be heard during normal operation of the vehicle. This split ring 12b acts as the axially directed spring biasing member.

Figure 12:
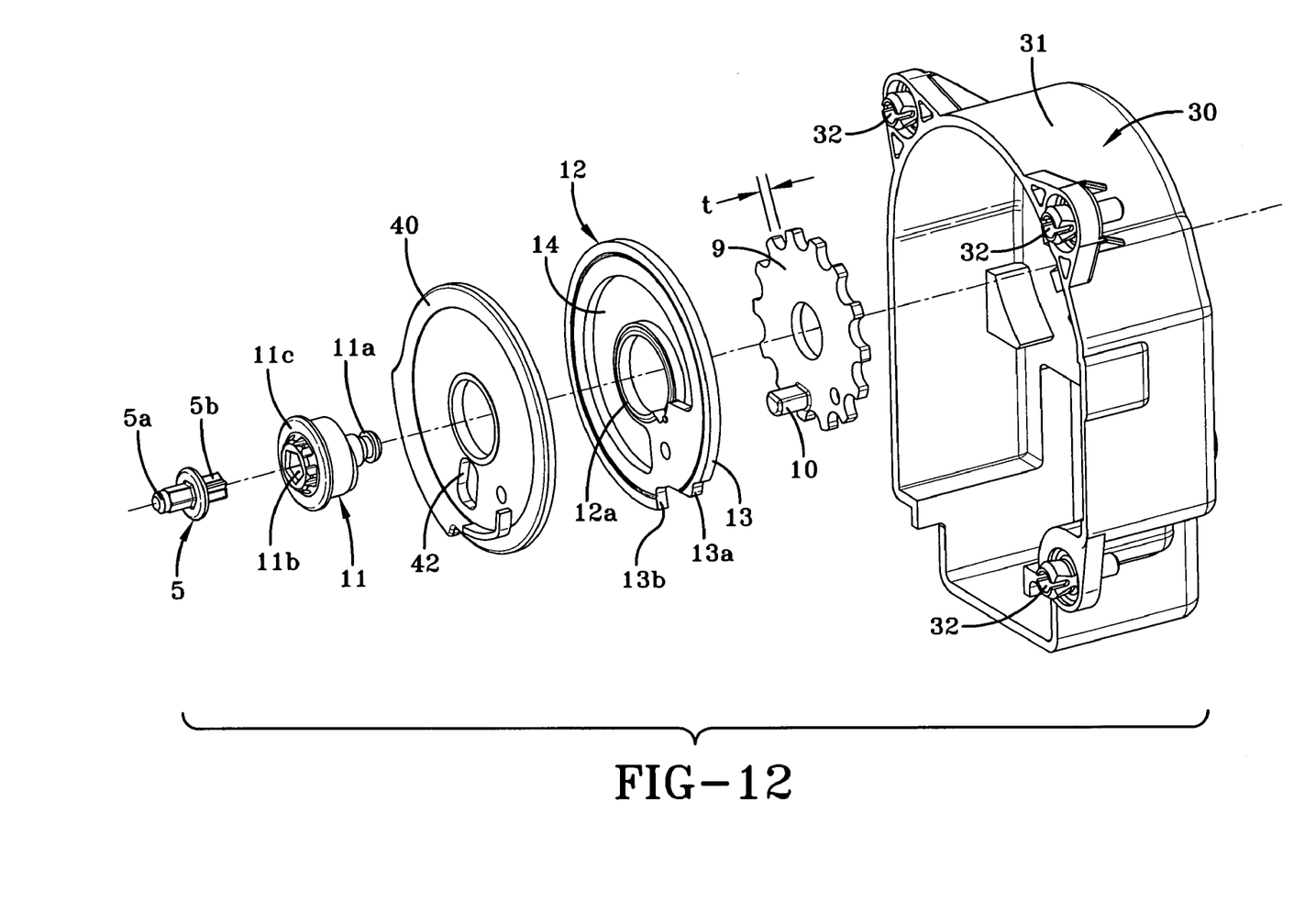
FIG. 12 is an exploded perspective view of a subassembly according to the present invention.
Figure 13:
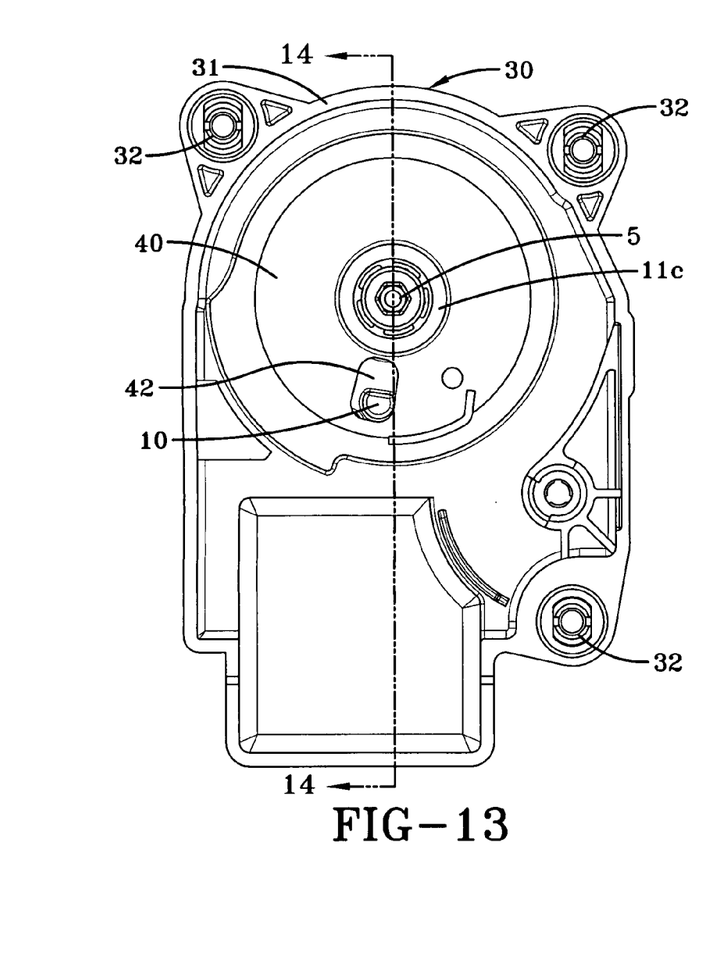
FIG. 13 is an assembled side view of the subassembly of FIG. 12.
Figure 14:
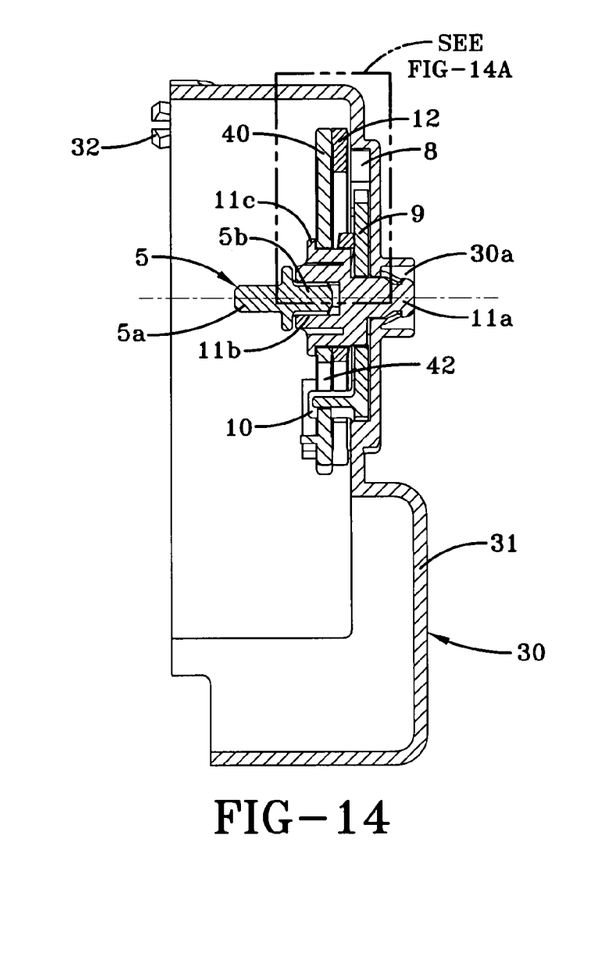
FIG. 14 is an assembled cross sectional view of FIG. 13 taken along lines 14-14.
Figure 14A:
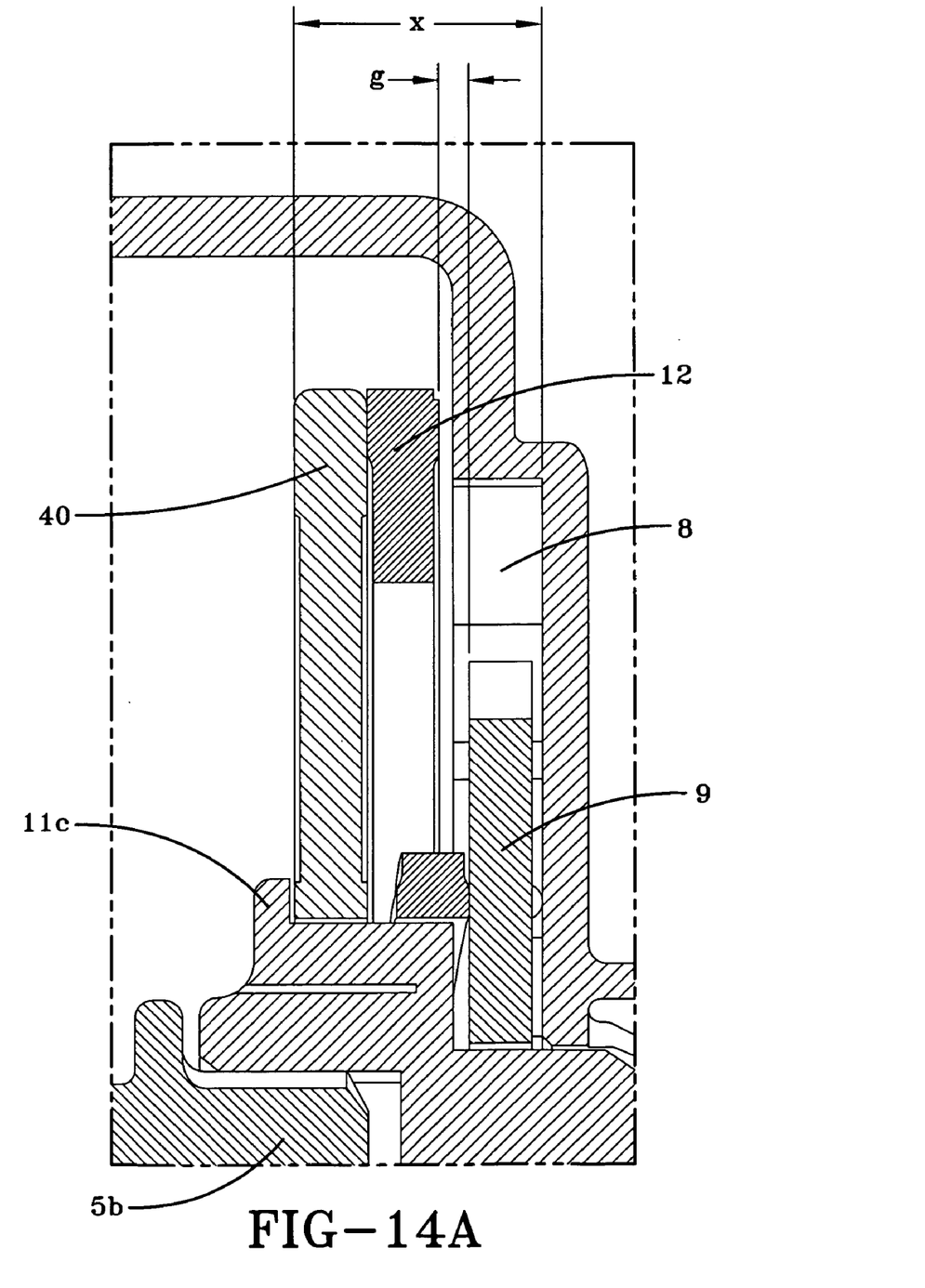
FIG. 14A is an enlarged portion of the cross section of FIG. 14 taken within the dashed lines marked 14A.
Figure 16:
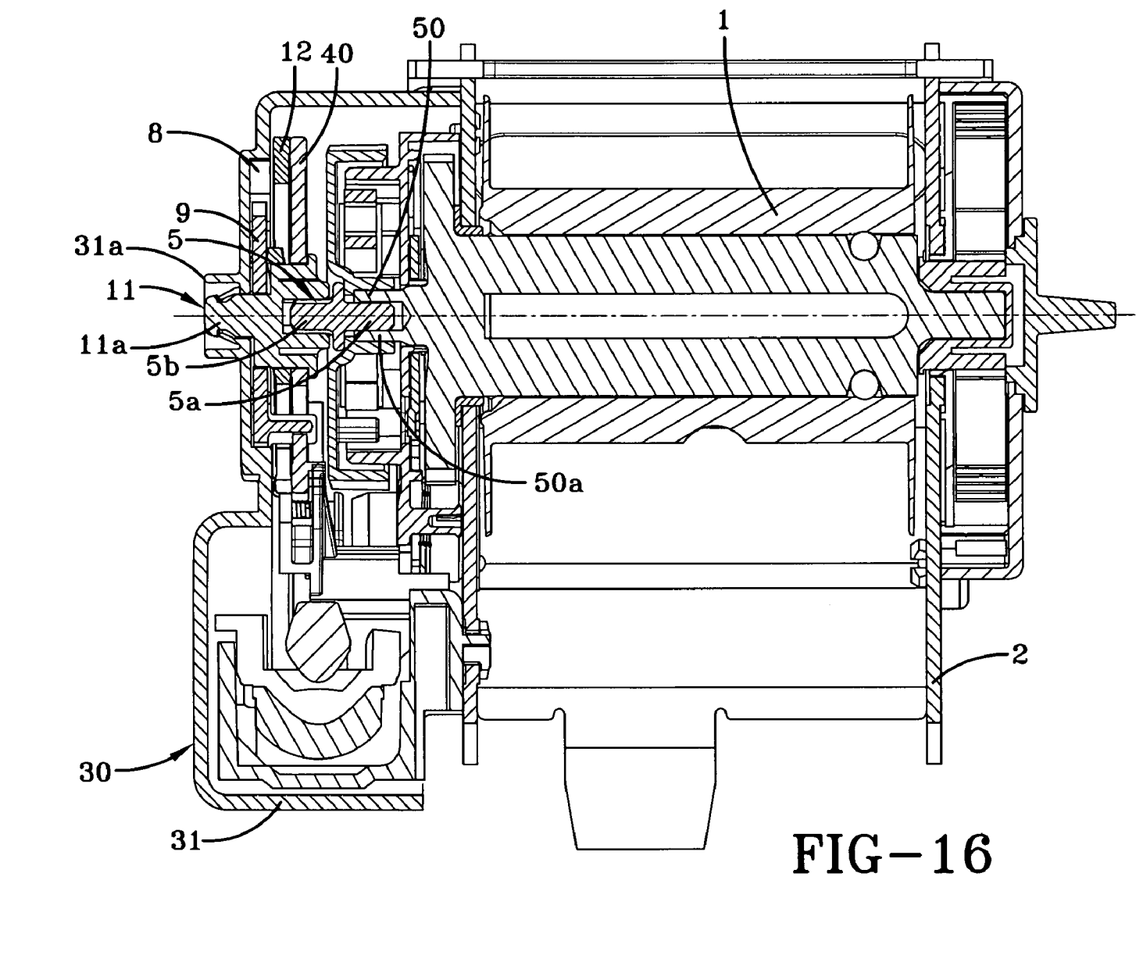
FIG. 16 is a cross sectional view of the seat belt retractor of FIG. 15 taken along lines 16-16.

With reference to FIGS. 12, 13, 14 and 15 the CHOM subassembly 30 is shown in exploded view in FIG. 12 on the far left is the drive pin 5, the eccentric cam 11, the blockout disk 40, the CHOM disk 12, and the wobble gear 9 as can be seen the eccentric cam 11 has a protruding flange 11c that retains the disk components and gears such that they are positioned between the flange 11c and the housing 31. With reference to FIG. 15 the end of the housing 31 on the inner surface includes the inner ring gear 8 which is complimentary to the wobble gear 9. With further reference to FIG. 14 as shown when the components are assembled the eccentric cam 11 has a projecting portion 11a that matingly engages with an opening 30a on the housing 31 such that they are captively retained holding all of the working mechanisms such as the disk 12, 40 and gear 9 and cam 11. At the opposite end, the drive pin 5 has an end portion 5b that is inserted into the eccentric cam opening 11b such that the drive pin 5 and eccentric cam 11 are adapted to rotate together when being driven by the drive axle 50. As further illustrated in FIG. 13 mounting projections 32 are provided on the exterior of the housing 31 in three locations. These mounting projections 32 are spring loaded such that it can be snapped into the retractor frame 2 at the hole locations 27. This is shown more clearly in FIG. 16 wherein the housing 31 is shown physically mounted to the frame 2. The drive pin 5 has an end 5b adapted to engage the axle opening 50a within the axle 50. With reference to FIG. 14 and FIG. 14A as can be seen each of the components, the wobble gear 9, the CHOM disk 12 and the blockout disk 40, each have a thickness (t) when mounted to the eccentric cam 11 the distance between the flange 11c and the inside wall of the housing 31 is represented as a distance X. Absent the present invention's axially directed spring member 12c, the disks and gear components would have a gap (g), g being the distance between the distance X and each of the components cumulative thickness (t). By providing this axially directed spring member 12c a deflection occurs such that the spring member 12c is pushed back taking up all the slack between the members such that they are all in contact and slightly pre loaded in the axial direction such that any noise or rattle due to the parts vibrating during normal use is eliminated and virtually reduced to zero. In order for the parts to rattle the spring force must be overcome by an acceleration of the various components. Since each of the components is made of plastic and relatively lightweight a significant amount of acceleration or vibration is required in order to stimulate a sufficient reaction to overcome the biasing spring force.

While it is the intention of the present invention to provide an efficient child holdout mechanism subassembly 30 that is both reliable and quiet it is also understood that this child holdout mechanism subassembly 30 is clearly adaptable to any number of seat belt retractors. These seat belt retractors can take a variety of shapes and sizes and accordingly the use of the noise reducing features may be modified as required, however, it is sufficient to indicate that the exemplary seat belt retractor 100 is provided only for purpose of illustration in explaining the design concept and how the noise reduction is achieved in the subassembly of components. Accordingly, it is understood that variations in the subassembly 30 can occur and that the axially directed spring biasing member can be provided on any of the rotating disk members including the wobble gear itself should that be desired. Alternatively, the spring biasing member could be provided as a separate component that provides sufficient absorption of the gap upon assembly such that the noise rattling feature can be achieved whether the component is integral to the disk which is the preferred method because it requires no additional components or whether it is provided as a separate component. In either case the beneficial attributes of reducing rattle within the assembly is achieved.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A seat belt retractor comprising a spool for carrying seat belt webbing rotatably mounted about a longitudinal axis and biased in a seat belt webbing rewinding direction, a toothed ratchet wheel mounted to rotate with the spool, a sensor for detecting an emergency condition, a vehicle acceleration sensor lever responsive to the sensor to engage the ratchet wheel in the event of an emergency condition, means for locking the spool against pay-out of seat belt webbing in response to the vehicle acceleration sensor lever engaging the ratchet wheel, the retractor having a means for switching between an emergency locking mode in which the spool is not locked and can rotate to pay-out and to rewind seat belt webbing and an automatic locking mode in which the spool is locked against pay-out of the seat belt webbing, wherein the switching means comprises a subassembly attached to a first end of said seat belt retractor, the subassembly having a housing and a plurality of annular axially adjacent disks mounted on a rotatable eccentric cam connected to said housing and having an axially directed spring biasing member to reduce axial spacing between said housing, eccentric cam and said plurality of annularly adjacent disks, the axially directed spring biasing member being an integral portion of one of said disks, and the plurality of axially adjacent disks comprising a gear having an axially projecting pin; a child hold out mechanism disk having a slot for accepting said projecting pin; and a blockout disk having an opening for accepting said pin.

2. The seat belt retractor of claim 1 wherein the subassembly further comprises a drive pin mounted at a first end of said axle of said seat belt retractor and fixedly attached to said eccentric cam as said seat belt webbing is protracted.

3. The seat belt retractor of claim 1 wherein the child hold out mechanism disk includes an integral axially directed spring biasing member.

4. The seat belt retractor of claim 1 wherein the spring biasing member axially applies a spring force to insure at least partial contact between each axially adjacent component sufficient to reduce rattle noise.

5. The seat belt retractor of claim 3 wherein the child hold out mechanism disk includes an inner ring portion mounted on said eccentric cam, said inner ring portion being split to form a spiraled ring having an axially directed spring biasing force.

6. The seat belt retractor of claim 5 wherein the axially directed spring biasing member extends axially a distance (y) from a generally planer surface of the disk and wherein a gap (g) between a flange on said eccentric cam and the plurality of disks and as measured as the distance (x) between an inside surface of the housing and an inside surface of the cam flange minus the combined axial thickness of the plurality of disks is (g), (g) being less than (y).

7. The seat belt retractor of claim 4 wherein the spring biasing member is radially adjacent said eccentric cam.

8. A subassembly attached to a first end of said seat belt retractor, the subassembly having a housing and a plurality of annular axially adjacent disks mounted on a rotatable eccentric cam connected to said housing, and an axially directed spring biasing member to reduce axial spacing between said housing, eccentric cam and said plurality of annularly adjacent disks wherein the axially directed spring biasing member is an integral portion of one of said disks, the plurality of axially adjacent disks comprising a gear having an axially projecting pin; a child hold out mechanism disk having a slot for accepting said projecting pin; and a blockout disk having an opening for accepting said pin.

9. The subassembly of claim 8 further comprising a drive pin mounted at a first end of said axle of said seat belt retractor and fixedly attached to said eccentric cam as said seat belt webbing is protracted.

10. The subassembly of claim 8 wherein the child hold out mechanism disk includes an integral axially directed spring biasing member.

11. The subassembly of claim 8 wherein the spring biasing member axially applies a spring force to insure at least partial contact between each axially adjacent disk sufficient to reduce rattle noise.

12. The subassembly of claim 8 wherein said adjacent disks with an axially directed spring biasing member interposed are spaced along opposing surfaces by a distance approximating a gap (g).

13. The subassembly of claim 10 wherein the child hold out mechanism disk includes an inner ring portion mounted on said eccentric cam, said inner ring portion being split to form a spiraled ring having an axially directed spring biasing force.

14. The subassembly of claim 13 wherein the axially directed spring biasing member extends axially a distance (y) from a generally planar surface of the disk and wherein a gap (g) between a flange on said eccentric cam and the plurality of disks and as measured as the distance (x) between an inside surface of the housing and an inside surface of the cam flange minus the combined axial thickness of the plurality of disks is (g), (g) being less than (y).

15. The subassembly of claim 14 wherein the spring biasing member is radially adjacent said eccentric cam.

* * * * *